Feb. 7, 1950     R. M. LANGER     2,496,295
VIBRATION SPECTROMETER

Filed Dec. 10, 1945     3 Sheets—Sheet 1

Inventor
RUDOLPH M. LANGER

Feb. 7, 1950 R. M. LANGER 2,496,295
VIBRATION SPECTROMETER
Filed Dec. 10, 1945 3 Sheets-Sheet 2

Inventor
RUDOLPH M. LANGER

Feb. 7, 1950  R. M. LANGER  2,496,295
VIBRATION SPECTROMETER

Filed Dec. 10, 1945  3 Sheets-Sheet 3

Inventor
RUDOLPH M. LANGER

By M. C. Hayes

Attorney

Patented Feb. 7, 1950

2,496,295

UNITED STATES PATENT OFFICE 2,496,295

VIBRATION SPECTROMETER

Rudolph M. Langer, United States Navy

Application December 10, 1945, Serial No. 634,123

8 Claims. (Cl. 73—70)

(Granted under the act of March 3, 1883, as amended April 30, 1928; 370 O. G. 757)

This invention relates to vibration spectrometers; and in particular, to a vibrometer which is based upon the principle of resonance and is adapted to show the spectrum of vibration to which a piece or part of an apparatus is subject, to show the interval of vibration and the frequency thereof in three degrees of freedom.

It is known in the art to provide vibrometers which are based upon the principle of resonant vibration of one or more "reeds." In general, such devices are incapable of direct determination of the exact frequencies of vibration for the reason that the reeds although varying in thickness are of fixed effective lengths, are not tunable and hence are not capable of vibrating resonantly except with a particular frequency. In contrast to this type of resonant vibrator, this inventor's device is provided with means for varying the length of i. e., tuning, the reeds in a series of variably graduated steps whereby the frequency of the vibration can be closely determined.

It is therefore an object of this invention to provide a vibration spectrometer which is adapted to show accurately the frequency of vibrations in three dimensions of freedom, if present as such, whereby phase and amplitude relationships of the vibrations can be determined.

It is also an object of this invention to provide a vibration spectrometer which is adapted to show the entire spectrum of the vibration at a glance.

It is a further object of this invention to provide a vibration spectrometer which is adapted to show the character of a complex vibration throughout an entire range which is variable from zero to many octaves in width.

It is an additional object of this invention to provide a vibration spectrometer which is adapted to show the damping characteristics of a vibrating body.

It is a further object of this invention to provide a vibration spectrometer which is adapted to show the phase relationship of different modes of vibration.

It is also an object of this invention to provide a means which is adapted to show transient phenomena in vibration.

These and other objectives will appear in the following description and the herewith appended claims, both of which are drawn to a preferred embodiment of the device.

In order to have a clear conception of this preferred embodiment, reference is now made to the drawings which are merely illustrative and in which.

Figure 1:
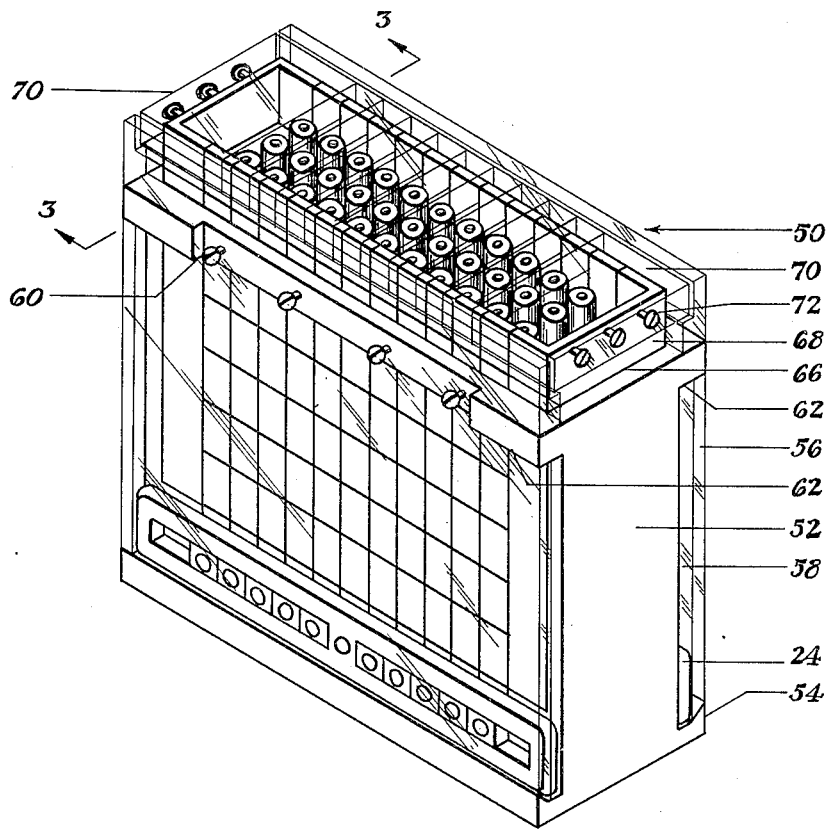
Figure 1 is an isometric view of the assembled spectrometer with the alignment links at bottom position.
Figure 2:
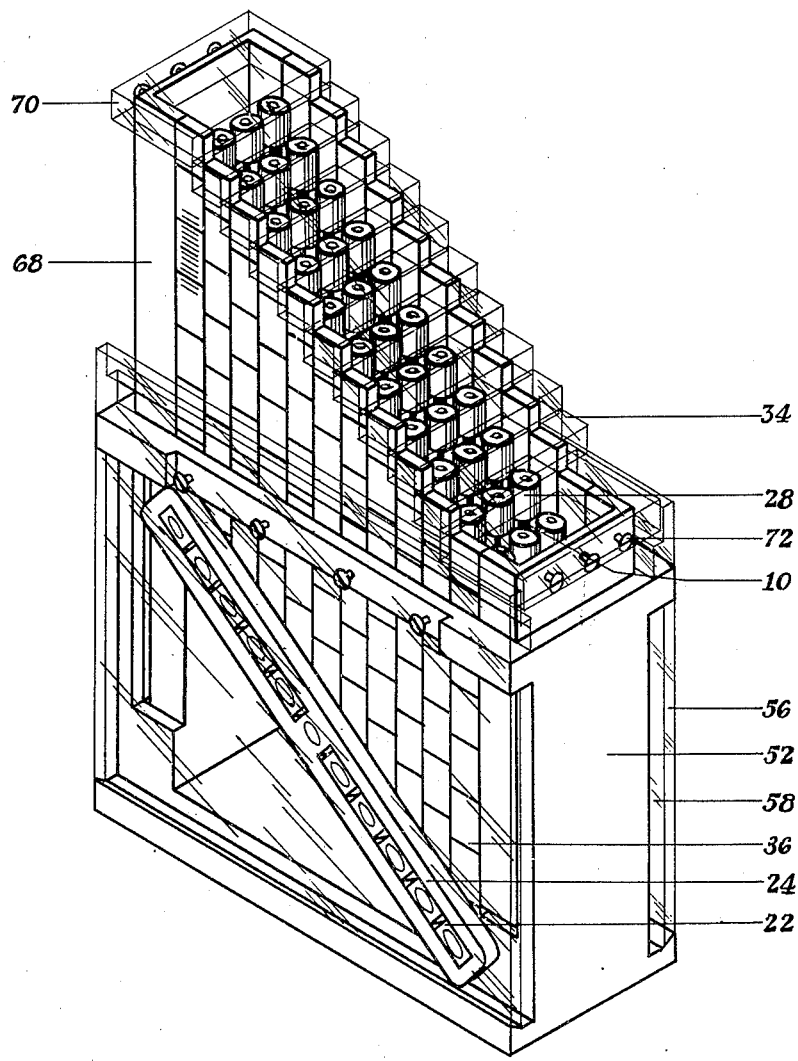
Figure 2 is an isometric view of the same with the alignment links in a slant position.
Figure 3:
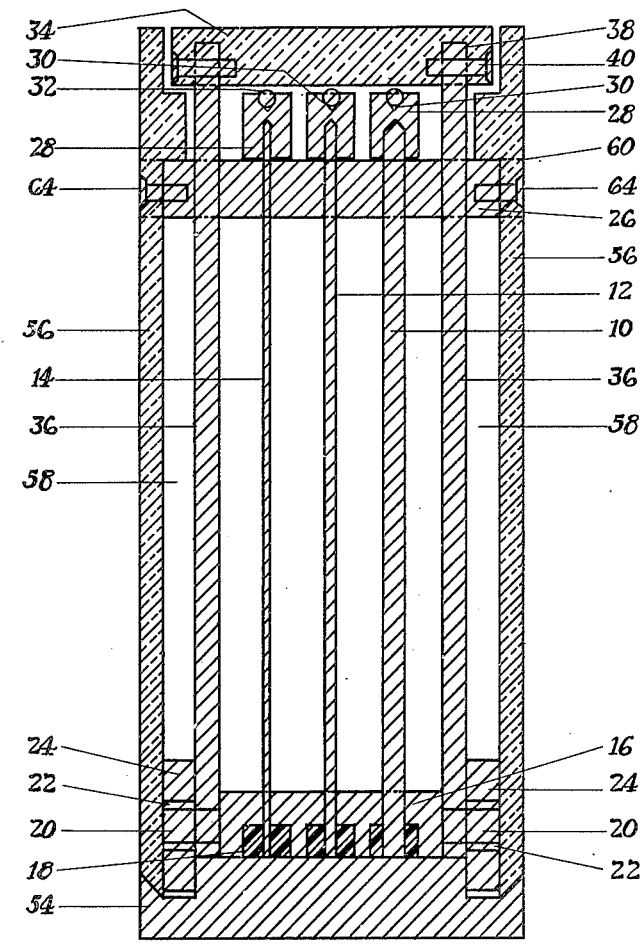
Figure 3 is a transverse vertical section taken along line 3—3 of Figure 1.

In the drawings, the same reference numerals refer to the same elements wherever applicable. 10, 12 and 14 represent a transverse series of elastic reeds which may be .08 inch, .05 inch and .02 inch in diameter respectively. They may be approximately 3 inches in length. These reeds are mounted in a trunnioned bottom bar 16 through which they project and to which they are attached by such means as welding or cementing as shown at 18. The body of this bottom bar is square in transverse cross section. Rotatably mounted on trunnion 20 of the bottom bar are slide blocks 22 which slidably engage alignment link 24. The reeds extend through channels in and are slidable with respect to table plate 26. They are lubricated with respect to this table top by a film of oil or grease. The tops of the reed may be capped with massive heads 28, the tops of which may be provided with sockets 30 in which polished steel balls 32 are inserted. The heads 28 may be blackened to contrast with the polished steel balls. The bottom bar of each transverse assembly of reeds is connected to rectangular cover piece 34 by means of measuring strips 36 which extend from trunnion 20 into slot 38 in cover piece 34 in which they are fastened by means of screws 40. Measuring strips 36 are of sufficient length to space cover piece 34 from steel balls 32. The measuring strips are graduated externally to indicate the length of the reeds in a transverse series extending from a reference line drawn on the case 50 on a line substantially opposite the upper surface of table plate 26. These measuring strips are constantly parallel to each other and tangent to each other, thereby enclosing the reeds at all times. Cover piece 34 may be of transparent plastic such as polyvinyl methacrylate resin and may include means to magnify the motions of the reeds. There are eleven transverse series of reeds assembled as in Figure 3 whereby the length of the reed subject to an impressed vibration can be varied at will so that ten equal steps will be provided between the longest and shortest reeds by moving the alignment link with respect to top plate 26.

A preferred form of the invention employs an odd number of transverse series of reeds and the trunnion 20 of the middle series of reeds may be centrally journalled in the alignment link 24 so that the link 24 is rotative about its center point and about the trunnion of the center-most bar 16. This may be achieved by securing the sliding block 22 at the center of the link 24, by spot welding or the like, or by journalling the trunnion 20 of the center number directly in the center of the link 24. By this means the other reeds of the system are adjusted symmetrically about the frequency of the center reed and the center reed always shows the average or mid-frequency of the components of the spectrum of response. Any even number of frequency steps are provided in this manner by employing an odd number of series of reeds with symmetrical adjustment of response about the central member. The assembly of reeds is contained in a box-like structure shown generally at 50. The latter comprises end plates 52, bottom plate 54 and table plate 26. Transparent side cover plates 56, which may be of polyvinyl methacrylate resin composition, are spaced from measuring strips as at 58 to provide room for the movement of alignment links 24. These side cover plates are beveled along their lower edges to match the bevel on bottom plate 54 on which they rest. They are notched as at 60 to fit over integral lugs 62 on end plate 52 and are fastened to table top 26 by means of screws 64. End plates 52 are transversely slotted as at 66 to receive channel shaped slide 68 which functions as a guide for the end transverse series of reeds. Slide 68 is slotted into and attached to cover piece 70 by means of screws 72. The end transverse series of reeds is attached to end cover piece 70 in the same manner as the other transverse series to their respective cover pieces. End cover piece 70 serves as a handle to move alignment links 24 in adjusting the effective reed length. End cover piece 70 projects over and beyond slide 68 forming a space between its under surface and table top 26 in which the fingers of the operator engage.

In operation, the preferred method is to place the assembled device upon the surface of a vibrating plate or other vibrating element with the reed heads and steel balls visible through the transparent cover pieces. The effective length of the reeds is then varied by holding one end handle in fixed position and elevating the other end handle to observe when one or more reeds vibrate resonantly with the impressed vibration. The vibration of a reed is indicated by a reflection of light from the steel ball positioned in its head. The direction and type of vibration can be determined from the motion of the steel balls. If, for example, amplitudes of vibration are equal in two directions and 90 degrees out of phase to each other, the ball will vibrate in a circle. With other more complex vibrations, the ball or balls will vibrate with a complex motion. In this manner the two horizontal components of the vibration are determined. The determination of the vertical component is made in the same manner as that of the horizontal component by merely turning the assembly on end. The vertical components then become vibrations which are transverse as to the reeds.

To determine the frequency of a vibration accurately, when two reeds of the same diameter but of different lengths are vibrating, the entire assembly of reeds is lifted by means of the alignment links to the shorter length. The links are then pivoted on the shorter length until a maximum vibration is obtained. The reed indicating the maximum vibration will accurately indicate the frequency of the vibration. The relative amplitude at adjacent reeds will give further information about the damping characteristics of the vibrating motion.

Each reed is calibrated for frequency as a function of length so that the frequency of an impressed vibration can be directly read. The range of frequency covered by this preferred embodiment is from 100 to 6,000 vibrations per minute, which is sufficient for the analysis of mechanical vibrations occurring in various types of apparatus.

When a non-periodic vibration or other transient vibration occurs its effect will be apparent on the reeds by the variation in their amplitude as a function of their length.

While the above description has been drawn to a preferred embodiment of the device involving cylindrical reeds and means for moving the reeds in varying lengths with respect to the table top, it is not desired to be strictly limited thereto as obviously reeds of other cross-sectional shape such as tubular, elliptical or rectangular could be used and the reeds could be held in fixed position and their effective length varied by having the table top movable with respect to the reeds. Such modifications are within the spirit and scope of this invention to the extent as defined by the herewith appended claim.

The invention described herein may be manufactured and used by or for the Government of the United States of America for governmental purposes without the payment of any royalties thereon or therefor.

I claim:

1. A vibration analyzing spectrometer comprising a linearly and parallel disposed set of tunable reeds, means anchoring the fixed ends of the reeds laterally equidistant in a sectionalized base, a linearly disposed set of vibration stops arranged in engagement with said reeds and in fixed uniform elevation relative to an unadjusted position of said base sections, means including a substantially lateral bar engaging the several base sections for manually adjusting the vertical positions, respectively, of said base sections according to a uniform arithmetic progression from either end of said base, whereby the reeds are tuned to different frequencies, the frequencies being in a uniform progression, and the spectrum range and the upper and lower limits of frequency response are widely variable at will for rapid analysis of complex vibrations.

2. The vibration spectrometer of claim 1 wherein said vibration stops are hollow slideable bushings supported in slip-fitted relation to said reeds, said bushings extending longitudinally along said reeds for preventing vibration of the reeds therebelow and confining said vibration to the upper portions thereof respectively.

3. The vibration spectrometer of claim 1 wherein said reeds are provided with similar weights at the upper ends thereof and with similar spheroidal light reflecting points set in said weights for visually displaying motion thereof.

4. The vibration spectrometer of claim 1 including a horizontal base and vertical channelled end supports thereon, wherein said sectionalized base comprises a group of contiguously arranged block members slideable within said supports, and having positioning pins extending horizontally therefrom, said adjusting means including parallel bars slideably engaging said positioning pins for maintaining said pins in linear alignment.

5. A vibration analyzing spectrometer comprising: a predetermined number of like smooth shanked tunable reeds disposed in a linear series; a housing comprising a horizontal base, end plates secured rigidly to said base and extending vertically therefrom, and a horizontal housing member secured to the upper ends of said end plates, said horizontal member having said predetermined number of spaced apertures therein constructed and arranged for receiving said reed shanks therethrough in vibration arresting relation; a frequency spectrum controlling mechanism in said housing including spaced anchor members supporting said reeds vertically beneath the corresponding said apertures, a journal extending laterally from each said anchor, and a bar member pivotally secured to one said journal and slottedly engaging each other said journal to maintain said anchor members in linear alignment for all adjustments thereof, said bar member being vertically and angularly adjustable at will within said housing, whereby said reeds are individually responsive, respectively, to impressed vibrations in a regular spectrum of frequencies of variable limits and spacings for measurement of vibrational modes at said frequencies; enclosing means for said reeds supported on said anchor members and extending laterally along the reeds slidably adjacent said horizontal housing member, and a scale member individual to each reed for indicating said length of reed shank above the horizontal housing member and a corresponding frequency element of said regular spectrum.

6. The spectrometer of claim 5 wherein said enclosing means comprises a pair of said scale members secured to said anchor members at either side thereof, and window members attached to the upper ends of said pair of members and covering the free ends of the reeds, the scale members and window members for adjacent reeds being arranged in relative sliding juxtaposition to maintain a closed volume within which the reeds vibrate as the frequency spectrum is varied.

7. The combination of claim 5 wherein each reed has a weighted free end and a spheroidal specular reflector mounted therein for rendering the path of vibratile motion of said reed persistently visible by light reflected from a spheroidal surface point.

8. A vibration spectrometer according to claim 5 having an odd number of said reeds and in which the centermost anchor member is pivoted in said bar member and the remaining reeds are adjustable in effective length symmetrically with respect to the centermost reed, whereby the frequency spectrum of the spectrometer is centered about that of said centermost reed.

RUDOLPH M. LANGER.

REFERENCES CITED

The following references are of record in the file of this patent:

UNITED STATES PATENTS

| Number | Name | Date |
| --- | --- | --- |
| 1,397,525 | Kennedy | Nov. 22, 1921 |
| 1,416,550 | Frank | May 16, 1922 |
| 1,687,507 | Perkins | Oct. 16, 1928 |
| 2,162,835 | Bringe | June 20, 1939 |
| 2,260,210 | Bourne | Oct. 21, 1941 |
| 2,303,234 | Schwarzkopt et al. | Nov. 24, 1942 |

FOREIGN PATENTS

| Number | Country | Date |
| --- | --- | --- |
| 445,470 | Germany | June 10, 1927 |